(12) United States Patent
Maeda

(10) Patent No.: US 7,466,331 B2
(45) Date of Patent: Dec. 16, 2008

(54) BOW-FREE TELECENTRIC OPTICAL SYSTEM FOR MULTIPLE BEAM SCANNING SYSTEMS

(75) Inventor: Patrick Y. Maeda, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 230 days.

(21) Appl. No.: 11/297,565

(22) Filed: Dec. 7, 2005

(65) Prior Publication Data

US 2007/0126849 A1   Jun. 7, 2007

(51) Int. Cl.
- B41J 2/435 (2006.01)
- B41J 15/14 (2006.01)
- G02B 26/08 (2006.01)
- G02B 23/24 (2006.01)
- G02B 3/08 (2006.01)

(52) U.S. Cl. .................. 347/224; 347/241; 359/215; 359/217; 359/362; 359/741

(58) Field of Classification Search .................. 347/233, 347/224, 241; 359/215, 217, 362, 741
See application file for complete search history.

(56) References Cited

U.S. PATENT DOCUMENTS

| | | | |
|---|---|---|---|
| 5,438,446 A * | 8/1995 | Brandt | ........................ 359/196 |
| 5,486,694 A * | 1/1996 | Harris | ........................ 250/236 |
| 5,512,949 A | 4/1996 | Fisli et al. | |
| 5,841,566 A * | 11/1998 | Minakuchi et al. | .......... 359/204 |
| 5,969,877 A | 10/1999 | Maeda | |
| 6,057,953 A * | 5/2000 | Ang | ........................... 359/204 |
| 6,577,429 B1 * | 6/2003 | Kurtz et al. | .................. 359/279 |
| 6,636,253 B2 * | 10/2003 | Nishiguchi et al. | .......... 347/259 |
| 6,833,939 B1 | 12/2004 | Ichikawa | |
| 7,088,382 B2 * | 8/2006 | Kim | ........................... 347/234 |
| 2003/0132372 A1 | 7/2003 | Lofthus et al. | |

FOREIGN PATENT DOCUMENTS

| | | |
|---|---|---|
| EP | 0 661 573 A1 | 7/1995 |
| JP | 2002-82296 A | 3/2002 |
| WO | WO 99/03012 A1 | 1/1999 |

* cited by examiner

*Primary Examiner*—Stephen D Meier
*Assistant Examiner*—Sarah Al-Hashimi
(74) *Attorney, Agent, or Firm*—Bever, Hoffman & Harms, LLP; Patrick T. Bever

(57) ABSTRACT

A multiple beam scanning system for scanning light beams onto a photoreceptor of an image forming apparatus. A pre-polygon input and output telecentric optical subsystem includes a beam conditioning system that focuses the light beams in a cross-scan direction, collimates the beams in the scan direction, and individually focuses the beams on a polygonal mirror deflector, which reflects the beams along a first scan path. A post-polygon input and output telecentric optical subsystem redirects the scanned beams along a second scan path and through an output window onto the photoreceptor, wherein the post-polygon subsystem includes a positive cross-scan cylindrical first optical element, a negative cross-scan cylindrical second optical element, and a positive cross-scan cylindrical third optical element. In one embodiment, the three cylindrical optical elements are cylinder mirrors. In another embodiment, one or more of the optical elements are cylinder lenses.

20 Claims, 13 Drawing Sheets

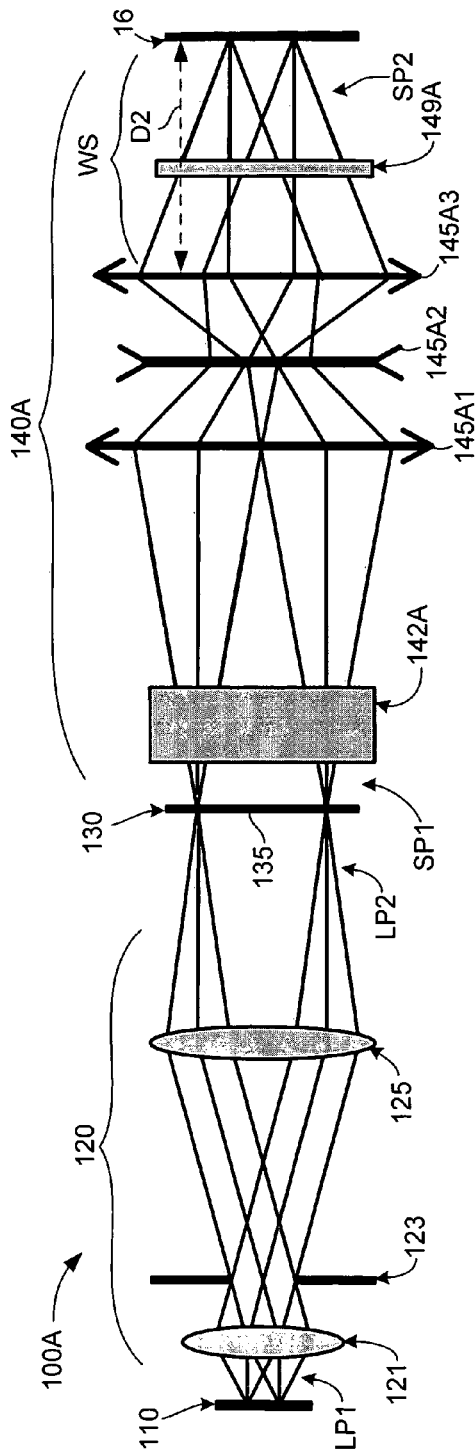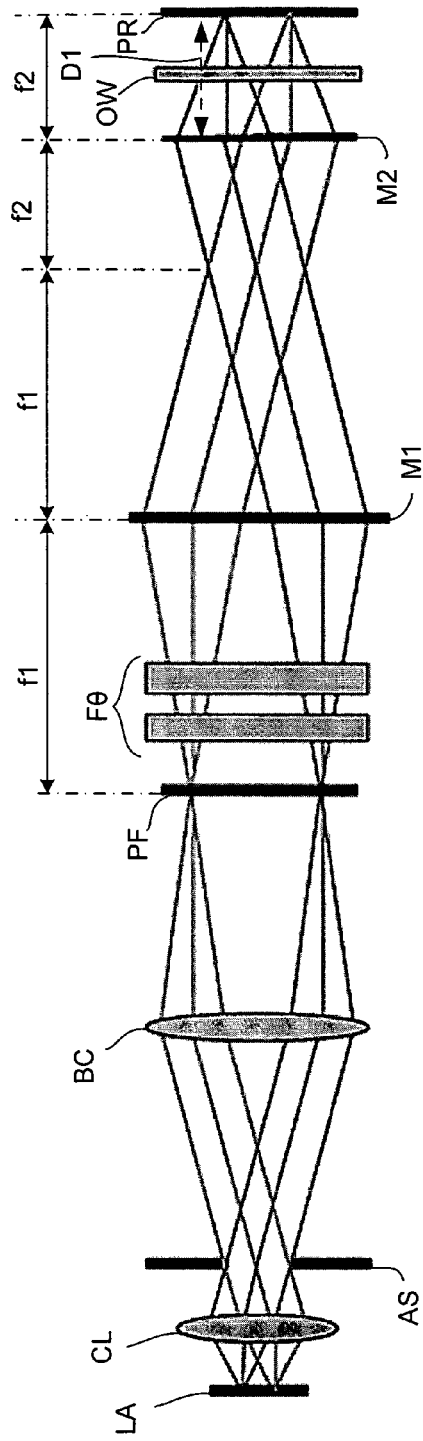
FIG. 2(A)
FIG. 2(B) (PRIOR ART)

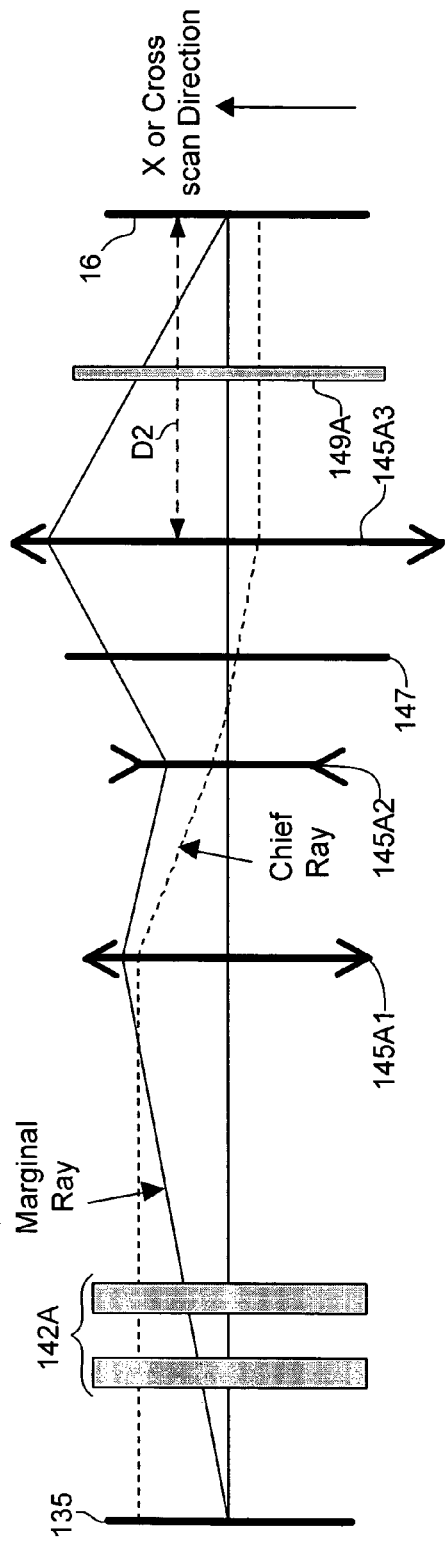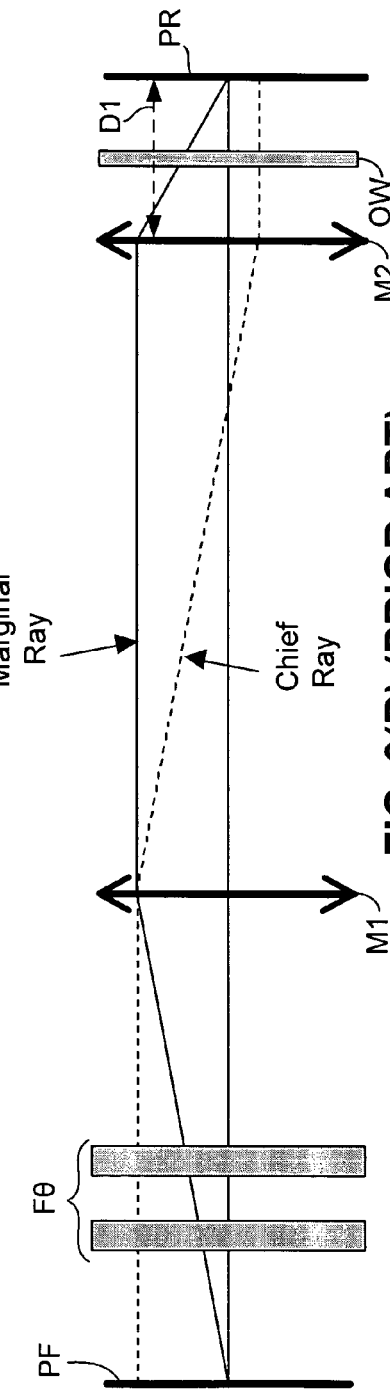
FIG. 9(A)
FIG. 9(B) (PRIOR ART)

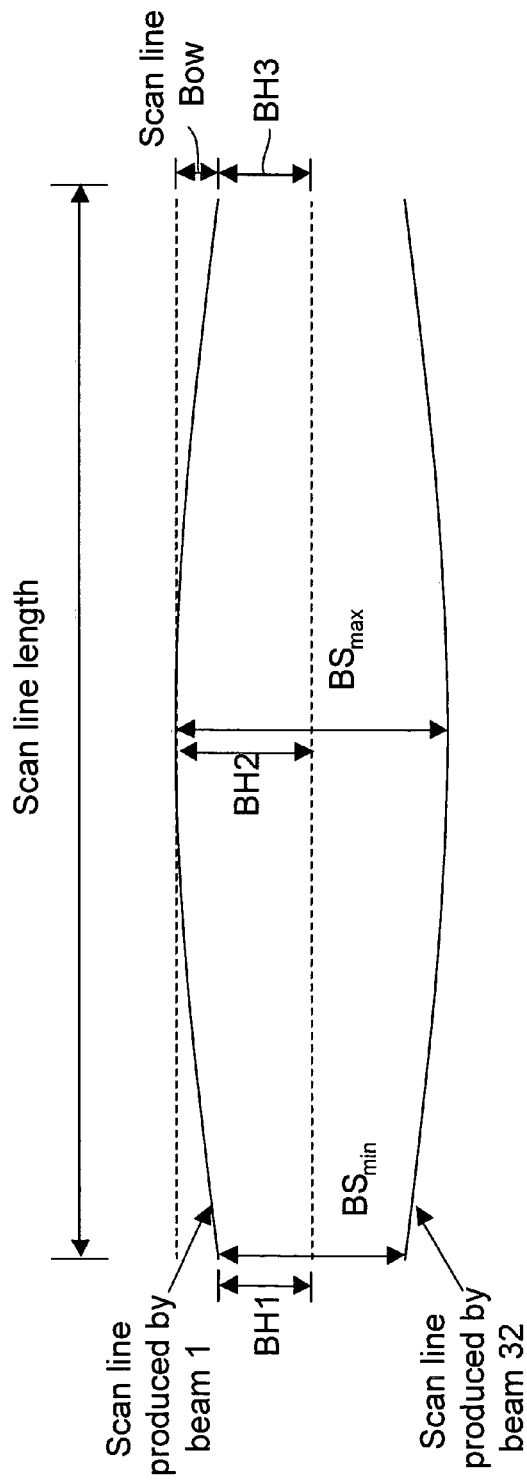

BH1 = Beam height at left end of scan
BH2 = Beam height at center of scan
BH3 = Beam height at right end of scan
Scan Line Bow = BH2-0.5*(BH1+BH3)
$BS_{min}$ = Minimum Spacing between first and last beam anywhere along the length of the scan line
$BS_{max}$ = Maximum Spacing between first and last beam anywhere along the length of the scan line
Differential Bow = $BS_{max} - BS_{min}$ Each beam in the array traces out a curved or bowed line as they are scanned across the photoreceptor or recording medium. Scan line shapes can be different than what is shown above.

FIG. 12

BOW-FREE TELECENTRIC OPTICAL SYSTEM FOR MULTIPLE BEAM SCANNING SYSTEMS

FIELD OF THE INVENTION

This invention relates to optical scanning systems and, more particularly, to a bow-free telecentric optical arrangement for multiple-beam raster output scanning (ROS) systems.

BACKGROUND OF THE INVENTION

Laser printers, scanners and photocopiers are widely known appliances for recording and/or printing images using laser (light) beams. Such appliances typically utilize a ROS system having a reflective multifaceted polygon mirror that is rotated about its central axis to repeatedly sweep one or more intensity modulated light beams across a recording medium (i.e., a photoreceptor, such as a drum or belt coated with a photosensitive material) in a line scanning direction (e.g., parallel to the drum's axis; also know as the scan direction) while the recording medium is being advanced in an orthogonal or "process" direction (e.g., along the drum's surface in a radial direction; also known as the cross-scan, slow scan, or sub-scan direction) such that the beam scans the recording medium in accordance with a raster scanning pattern.

Next-generation multiple beam scanners for laser printing will employ semiconductor laser arrays with large numbers of beams (up to 32 and higher). The advantage of utilizing a large number of beams is the increased bandwidth capability that will be used to increase speed and scan resolution by factors up to four and higher, and enable revolutionary printer features.

One problem associated with multiple beam scanning optical systems is that, due to the two dimensionality of the array, beams are offset in the scan direction. This results in the off-axis beams being collimated at non-zero angles. The non-zero angles require a larger polygon facet to capture all of the beams. For polygons with six or more facets the polygon size can become prohibitively large.

Another problem associated with multiple beam scanning optical systems is that low levels of bow, diffraction limited aberration correction, and wobble correction are required for good image quality. Referring to FIG. 12, "scan line bow" is a measure of distortion in the cross-scan direction from one end of the scan to the other. Bow may be calculated by taking the average of the cross-scan heights BH1 and BH3 at the extreme ends of the scan line, then subtracting it from the cross-scan height BH2 at the center of the scan line. In a multiple beam system, each light source emitting a beam has its own bow curve. As indicated in FIG. 12, an uppermost beam of the multiple beam system traces the upper scan line, and a lowermost beam traces the lower scan line. The maximum spacing between the uppermost beam and the lowermost beam anywhere along the scan line is shown as $BS_{max}$. The minimum spacing between the uppermost beam and the lowermost beam anywhere along the scan line is shown as $BS_{min}$. The difference between the maximum and minimum beam spacings, $BS_{max}-BS_{min}$, defines the "differential bow". Diffraction limited optical systems are ones in which the optical aberrations are low enough that diffraction effects determine its performance. Wobble is caused by changes in the polygon facet tilt angle due to non-symmetry of the rotating polygon mirror, which causes the reflected beams to be displaced relative to their ideal cross-scan position on the photoreceptor. For manufacturability reasons, multiple beam scanning optical systems also require a reasonable degree of telecentricity, i.e., output beams with small cross-scan chief ray angles. Telecentricity ensures that the beam separation does not vary greatly with changes in the distance between the ROS and photoreceptor.

For conventional dual-beam systems, the beams are typically off-axis by 21 μm to 63.5 μm in the cross-scan direction at the photoreceptor plane. At these dimensions, near-telecentric systems with single-cylinder mirror wobble correction optics are sufficient to achieve low-bow, diffraction limited performance. However, for future systems that will employ two-dimensional laser arrays with up to 32 beams and higher, where the beams can be off-axis by as much as 500 μm in the cross-scan direction at the photoreceptor plane, current systems will be inadequate.

FIG. 2(B) is an unfolded, cross-scan view showing a conventional optical system disclosed in U.S. Pat. No. 6,833,939 (Ichikawa, incorporated herein in its entirety) that is capable of achieving negligible amounts of scan line bow and diffraction limited imaging for large beam separations. The optical system is positioned between a laser array LA and a photoreceptor PR, and includes a pre-polygon (laser to facet) optical subsystem made up of a collimator lens CL, an aperture stop AS, and a beam conditioning lens BC, and a post-polygon (facet to photoreceptor) optical subsystem including an Fθ scan lens, first and second concave cylinder mirrors M1 and M2, and an output window OW. Both the pre-polygon and post-polygon optical subsystems are input and output telecentric. The post-polygon optical system is afocal in that it is input and output telecentric. This explains why a single cylinder mirror wobble correction system will not work since an afocal system with the desired properties requires at least two elements.

The combination of a refractive cylinder lens and a cylinder mirror can produce an afocal system (see U.S. Pat. No. 5,512,949, Fisli, Grafton, Xerox Corporation, also incorporated by reference in its entirety). However, the performance of this optical system is inadequate for large beam separations.

Wobble correction is achieved in the optical system of FIG. 12 by imaging or nearly-imaging the facet PF onto the photoreceptor PR in the cross-scan direction. Because the facet is a real object, the afocal optical system must be of the Keplerian type. In a Keplerian configuration, the object and image is separated by twice the sum of the cylinder mirror focal lengths, 2 (f1+f2), and the distance from the second mirror M2 to the photoreceptor PR is equal to the focal length f2 of the second cylinder mirror M2. The magnification is equal to the negative ratio of the focal lengths, −f2/f1, where f1 and f2 are the focal lengths of the first and second cylinder mirrors M1 and M2, respectively.

With the optical system of FIG. 12, the cross-scan post-polygon magnification is typically less than −0.5. This means that the distance between the second cylinder mirror M2 and the photoreceptor PR will be smaller than the distance between the facet PF and the first cylinder mirror M1.

For beams that are off-axis by ±500 μm, the optical system of FIG. 12 is capable of achieving residual scan line bow levels below 0.1 micron at maximum beam separations up to 1 mm, and a telecentricity less than 0.1 mrad. The architecture may be able to obtain this kind of performance at higher beam separations.

While the optical system of FIG. 12 can be used in next generation scanning optical systems that employ two-cylinder mirror wobble correction optics, such two-cylinder mirror system has a short working distance D1 (i.e., distance between second mirror M2 and photoreceptor PR), which precludes its use in appliances that require a larger working distance to provide room for other subsystems that must be located close to the photoreceptor surface or to provide denser packing in print engines that utilize multiple optical scanning systems.

What is needed is a multiple beam optical system that facilitates the use of polygon beam deflectors having minimum facet size, and that also features low levels of bow, diffraction limited aberration correction, and wobble correction, a reasonable degree of telecentricity, and also provides a relatively large work space distance between the output window and the photoreceptor.

SUMMARY OF THE INVENTION

The present invention is directed to a multiple beam scanning system for scanning light beams onto a photoreceptor of an image forming apparatus in which a post-polygon input and output telecentric optical subsystem redirects the scanned beams along a second scan path and through an output window onto the photoreceptor, where the post-polygon subsystem includes a positive cross-scan cylindrical first optical element, a negative cross-scan cylindrical second optical element, and a positive cross-scan cylindrical third optical element arranged in sequential order. This positive-negative-positive arrangement facilitates both the bow-free telecentric optical characteristics, and also facilitates a substantially longer work area (measured from the third optical element to the photoreceptor) than that possible in conventional two-mirror post-polygon optical systems.

In accordance with a first embodiment of the present invention, the post-polygon optical system includes a first concave cylinder mirror, a convex cylinder mirror, and a second concave cylinder mirror arranged between a substantially standard scan lens and a flat output window. This arrangement provides superior optical characteristics including zero or very little bow and almost complete telecentricity without requiring additional optical elements.

In accordance with a second disclosed embodiment, a scanning system includes a post-polygon optical subsystem including a convex cylinder lens surface, a convex cylinder mirror, and a concave cylinder mirror that are sequentially optically aligned between deflector and an output window. This arrangement of optical elements outputs scanned light beams that are near telecentric, and provide a relatively large work space distance. An optional fourth cylindrical optical element may be utilized to balance unwanted optical characteristics that may be introduced by the use of the convex cylinder lens surface (i.e., instead of a cylinder mirror). In one embodiment, this fourth optical element may be introduced by forming the system output window as a negative cylinder lens with one or two concave cylinder surfaces.

In accordance with an aspect of the present invention, the pre-polygon input and output telecentric optical subsystem includes a collimator lens, an aperture stop, and a multi-lens beam conditioning system including five cylinder lenses that are optically aligned between the laser array and the deflector for focusing the light beams in a cross-scan direction and collimating the light beams in the scan direction such that the light beams are individually focused as linear images adjacent to the deflector and have desired beam sizes and spacings in the scan and cross-scan directions at the deflector.

BRIEF DESCRIPTION OF THE DRAWINGS

These and other features, aspects and advantages of the present invention will become better understood with regard to the following description, appended claims, and accompanying drawings, where:

FIG. 2(A) is an unfolded, cross-scan diagram showing a multiple beam scanning system according to a first specific embodiment of the present invention;

FIG. 2(B) is an unfolded, cross-scan diagram showing a conventional multiple beam scanning system;

FIG. 9(A) is a simplified unfolded diagram showing optical characteristics of the post-polygon optical subsystem of FIG. 8;

FIG. 9(B) is a simplified unfolded diagram showing optical characteristics of a conventional two mirror post-polygon optical subsystem;

FIG. 12 is a diagram depicting scan line bow; and

DETAILED DESCRIPTION OF THE DRAWINGS

Figure 1:
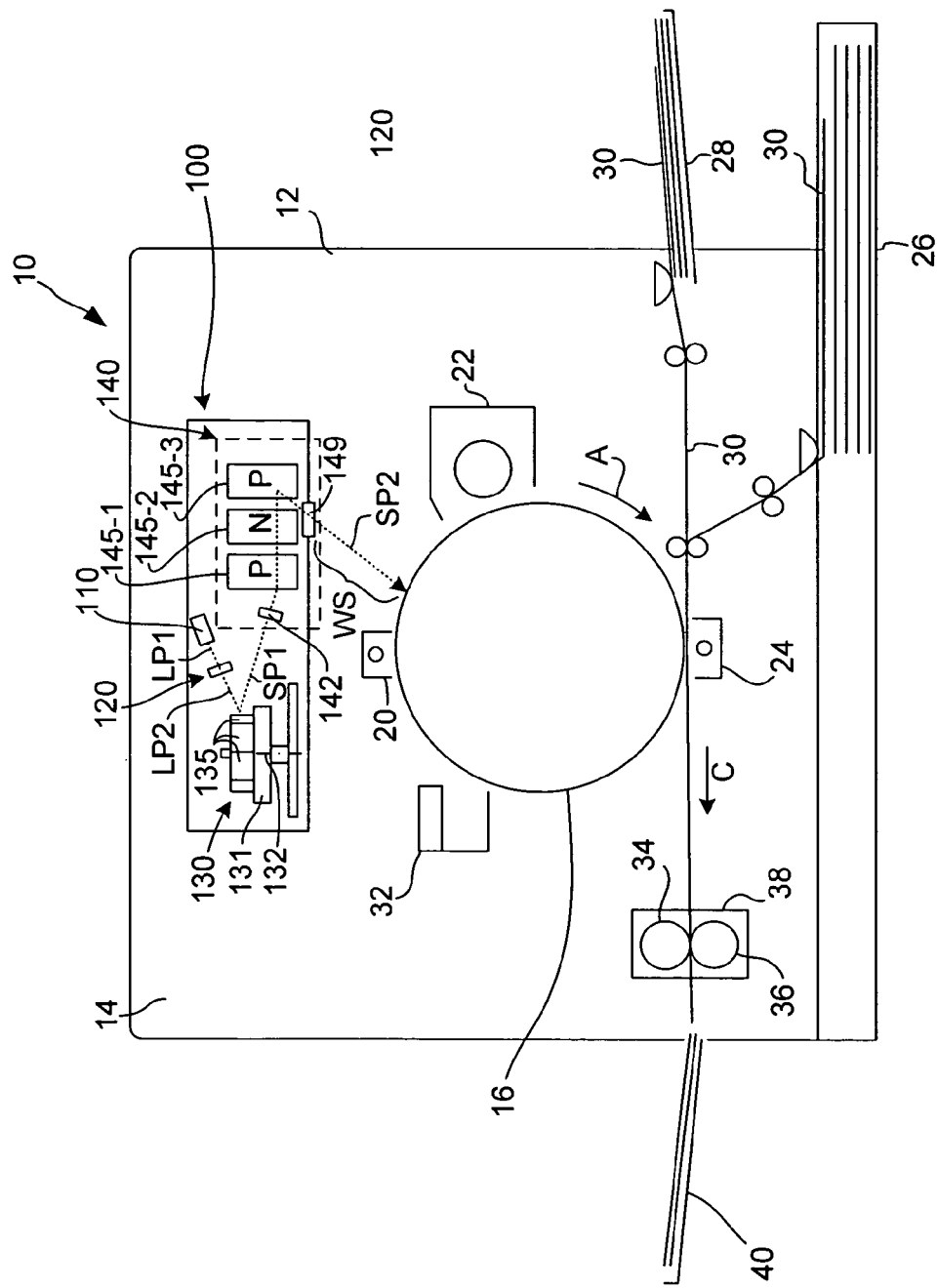
FIG. 1 is a simplified diagram showing portions of an image forming apparatus including a multiple beam scanning system according to an embodiment of the present invention.

FIG. 1 is a simplified diagram showing portions of an image forming apparatus 10 including a multiple beam scanning system 100 according to the present invention. Representative portions of image forming apparatus 10 are shown and described below for purposes of providing context for the present invention, and are not intended to limit the appended claims unless specifically recited. Those skilled in the art will recognize that the description of these representative portions is greatly simplified for brevity. Multiple beam scanning system 100 is depicted in representative form in FIG. 1, and specific features associated with multiple beam scanning system 100 according to alternative embodiments are provided herein.

Referring to FIG. 1, image-forming apparatus 10 includes a casing 12 surrounding an image forming section 14. Image forming section 14 includes a cylindrical photosensitive drum (photoreceptor) 16 rotating at a constant speed in the direction of arrow A, with multiple beam scanning system 100 positioned to emit light beams, while scanning in the manner described below, toward the photosensitive drum 16. The scanning light beams are modulated on the basis of desired image data (e.g., binary or gray scale image data for forming monochromatic images). A charger 20 is disposed in a vicinity of the peripheral surface of photosensitive drum 16. Charger 20 uniformly charges photosensitive material formed on the surface of drum 16, which is then irradiated by the modulated light beams emitted from scanning system 100. In this way, a latent image is formed on the peripheral surface of photosensitive drum 16. A developer 22 is positioned to supply toner to photosensitive drum 16 such that the toner adheres to the irradiated portions, thereby forming a toner image on the peripheral surface of photosensitive drum 16. A charger 24 is positioned downstream of the developer 22, and functions to transfer the toner image from drum 16 onto paper 30, which is guided between drum 16 and charger 24 for transfer 24 from a paper tray 26 or manual feed tray 28 according to known techniques. A cleaner 32 is located downstream of charger 24 for removing any toner remaining on drum 16, thereby the surface of drum 16 for a new cycle. The paper 30 on which the toner image is transferred is conveyed in the direction of arrow C through a fixer 38 including a pressing roller 34 and a heating roller 36. Fixer 38 heats and presses the paper 30, thereby fusing and affixing the toner to the paper 30. After the fixing process, the paper 30 having the image printed thereon is discharged into a discharge tray 40.

As indicated in FIG. 1, multiple beam optical scanning system 100 generally includes a light source 110, a pre-polygon optical subsystem 120, a deflector 130, and a post-polygon optical subsystem 140. Light source 110 transmits multiple parallel light beams along a first light path LP1 to pre-polygon optical subsystem 120, which operates as described below to direct the light beams along second light path LP2 onto deflector 130. In one embodiment, deflector 130 includes a polygonal mirror structure 131 that is driven to spin about an axis 132 and includes multiple facet mirrors 135 that are positioned to intersect second light path LP2 such that the light beams are repeatedly swept through a fan-shaped (first) scan path SP1. Post-polygon optical subsystem 140 includes a scan lens section 142 that is positioned to receive the light beams passed along first scan path SP1, and a series of three or more optical elements (i.e., either lenses or mirrors, represented in FIG. 1 by blocks 145-1, 145-2 and 145-3) that are sequentially optically aligned to receive the light beams scanned along first scan path SP1, and to redirect the scanned plurality of light beams through an output mirror 149 along a second scan path SP2 such that the scanning light beams are directed onto photosensitive drum 16. The term "sequentially optically aligned" is used herein to indicate that light beams traveling from deflector 130 to photosensitive drum 16 are directed along light path segments that intersect, in order, the associated optical elements. For example, in FIG. 1, light beams passed from scan lens section 142 are received and processed by optical element 145-1 before being received/processed by optical element 145-2, and light beams passed from optical element 145-1 are received and processed by optical element 145-2 before being received/processed by optical element 145-3. Note that "sequentially optically aligned" is intended to allow for one or more additional optical elements (e.g., flat mirrors) included between the optical elements 145-1 to 145-3 that may direct light beams in various directions between optical elements 145-1 to 145-3.

In accordance with an aspect of the present invention, both pre-polygon optical subsystem 120 and post-polygon subsystem 140 are both input and output telecentric or near telecentric (i.e., within several milliradians of telecentric) in the cross-scan plane. In addition, the desired increased work space WS between post-polygon optical subsystem 140 and photosensitive drum 16 is achieved by forming post-polygon optical subsystem 140 using optical elements 145-1, 145-2 and 145-3 that include a positive cross-scan cylindrical first optical element 145-1, a negative cross-scan cylindrical second optical element 145-2, and a positive cross-scan cylindrical third optical element 145-3. In particular, by providing three or more optical elements between deflector 130 and photoreceptor 16 that are arranged to converge (by way of first optical element 145-1), then diverge (by way of second optical element 145-2), then converge (by way of third optical element 145-3) the light beams, post-polygon optical subsystem 140 both facilitates the desired output telecentricity on output scan path SP2, and, in addition, provides an architecture in which a relatively large working distance WS is provided between third optical element 145-3 and photorecector 16, thereby facilitating the placement of components of, for example, a host image forming apparatus adjacent to photorecector 16.

The present invention will now be described in additional detail with reference to certain specific embodiments.

FIG. 2(A) is an unfolded, cross-scan diagram showing a multiple beam scanning system 100A according to a first embodiment of the present invention. Scanning system 100A generally includes laser array 110, pre-polygon optical subsystem 120, deflector 130, and a post-polygon optical subsystem 140A. Pre-polygon optical subsystem 120 generally includes a collimator lens 121 that receive light beams transmitted on first light path LP1 by laser array 110, an aperture stop 123, and beam conditioning optics 125 that pass conditioned light beams along second light path LP2 onto rotating mirror facet 135 of deflector 130. Rotating mirror facet 135 scans the light beams along first scan path SP1, where the scanned light beams are processed by post-polygon optical subsystem 140A. In accordance with the present embodiment, post-polygon optical subsystem 140A includes one or more scan lenses 142A that direct the light beams onto a three-mirror arrangement including a first concave (positive) cylinder mirror 145A1, a convex (negative) cylinder mirror 145A2, and a second concave (positive) cylinder mirror 145A3. As indicated by the optical lines depicted in FIG. 2(A), the light received by concave cylinder mirror 145A1 is converged and directed onto convex cylinder mirror 145A2, which diverges and redirects the light beams onto concave cylinder mirror 145A3, which in turn reconverges the light beams, and passes the reconverged light beams through a flat glass output window 149A and onto photoreceptor 16. By utilizing the concave-convex-concave mirror arrangement of post-polygon optical subsystem 140A in the manner illustrated in FIG. 2(B), the present invention formation of concave cylinder mirror 145A3 with a relatively long focal length, thereby providing a substantially longer working distance D2 than the working distance D1 that is possible in conventional two-mirror arrangements (depicted in FIG. 2(B)).

Figure 3:
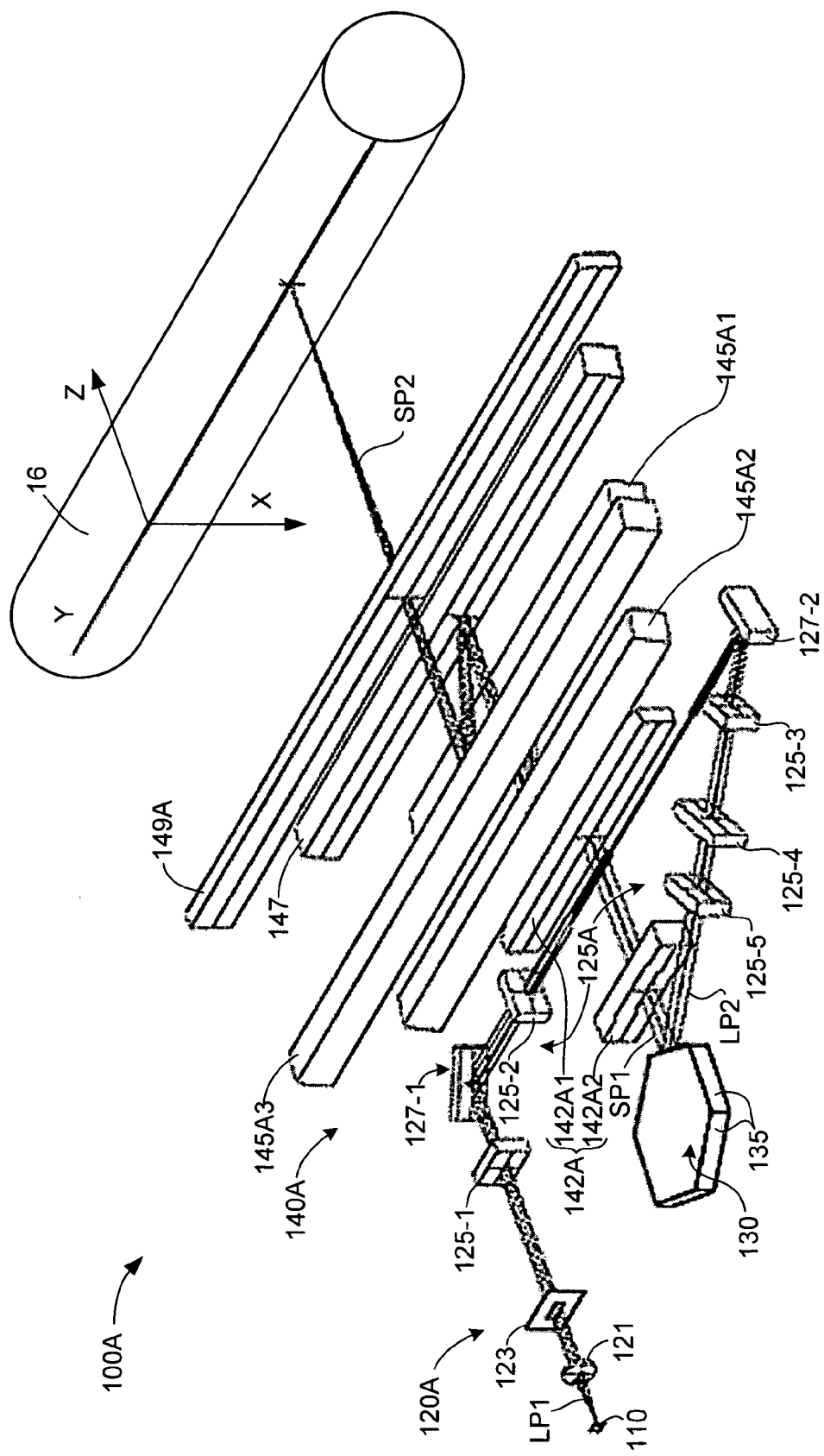
FIG. 3 is an exploded perspective view showing a multiple beam scanning system according to a specific embodiment of the present invention.

FIG. 3 shows multiple beam optical scanning system 100A in additional detail according to a specific embodiment of the present invention. Multiple beam optical scanning system 100A includes a semiconductor laser array 110 for generating light beams along first optical path LP1, a low scan line bow pre-polygon optical subsystem 120A for processing and redirecting the light beams along second light path LP2 to deflector 130, and three-cylinder-mirror, wobble correction post-polygon optical subsystem 140A for receiving the scanned light beams passed along scan path SP1, and for processing and redirecting the light beams along second scan path SP2 onto photoreceptor 16. The various portions of optical scanning system 100A are described in additional detail below.

Figures 4A, 4B:
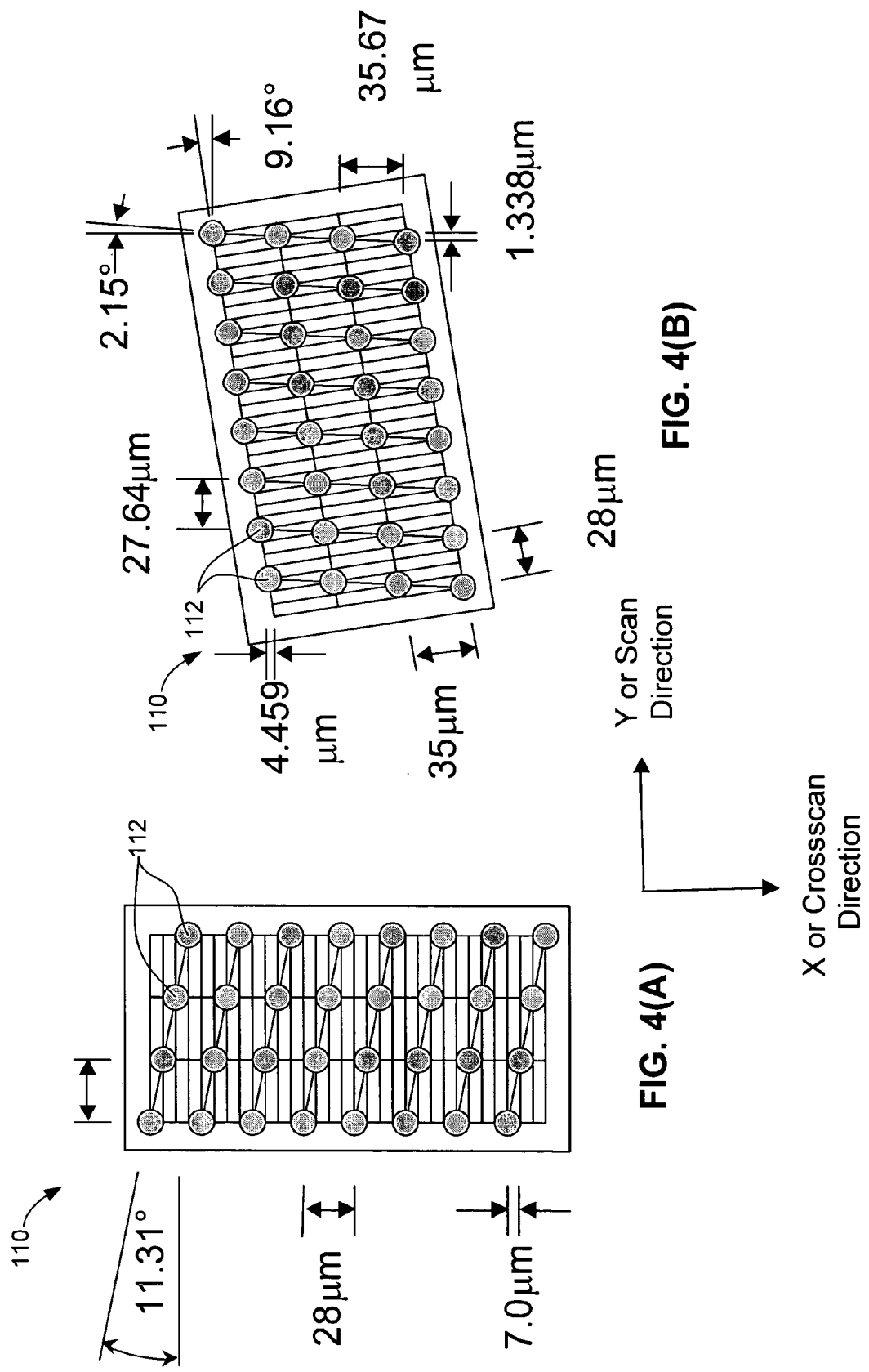
FIGS. 4(A) and 4(B) are diagrams showing a 32-beam semiconductor laser array in non-rotated and rotated orientations, respectively.

FIGS. 4(A) and 4(B) show an exemplary semiconductor laser array, which in the present embodiment is a VCSEL (Vertical Cavity Surface Emitting Laser) array 110 having 32 light emission regions 112 disposed in a two-dimensional arrangement or layout (i.e., light emission regions 112 are arranged in an eight row, four column pattern). FIG. 4(A) shows VCSEL array 110 in a first (non-rotated) orientation, and FIG. 4(B) shows VCSEL array 110 in a rotated orientation. Light is emitted from light emission regions 112 normal to the laser array surface (e.g., out of the drawing sheet surface) such that the 32 light beams are parallel to each other as they leave VCSEL array 110.

Referring again to FIG. 3, all 32 parallel light beams travel along light path LP1 such that the light beams enter pre-polygon optical subsystem 120A formed by collimator lens 121, aperture 123, and a multi-lens beam conditioning system 125A.

Figure 5:
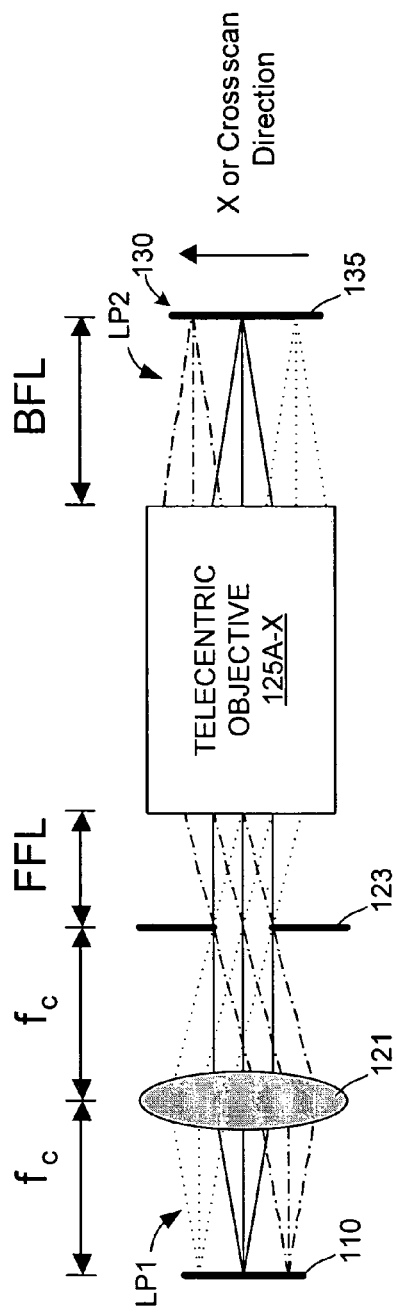
FIG. 5 is an unfolded cross-scan view showing a first portion of a beam conditioning system utilized in the pre-polygon optical subsystem of the multiple beam scanning system of FIG. 3.
Figure 6:
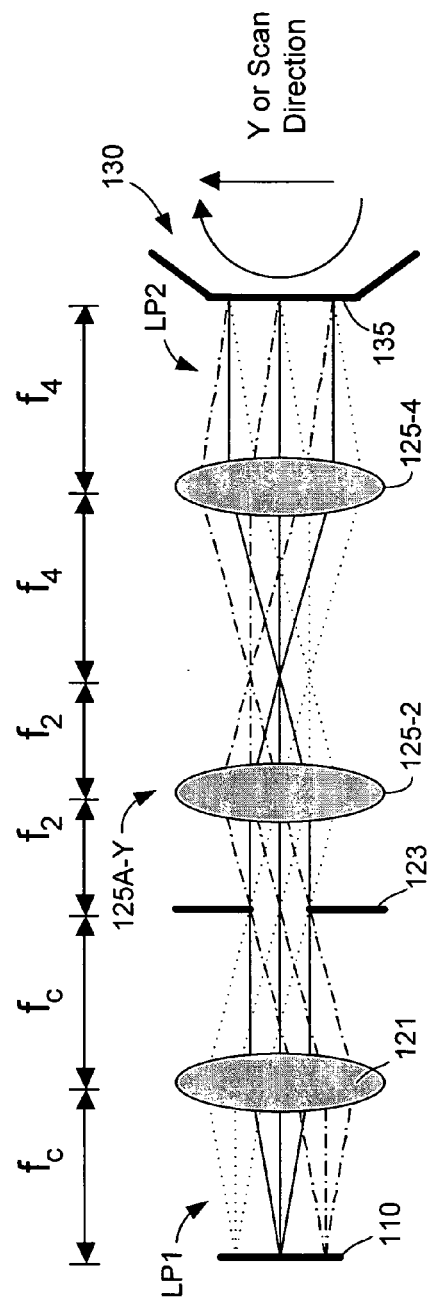
FIG. 6 is an unfolded cross-scan view showing a second portion of a beam conditioning system utilized in the pre-polygon optical subsystem of the multiple beam scanning system of FIG. 3.

Collimator lens 121 transforms the plural light beams, which are emitted along light path LP1 from VCSEL array 110, from divergent to substantially parallel light. These collimated light beams intersect at the rear focal point of collimator lens 121, where aperture stop 123 is located, as shown in FIGS. 5 and 6. The light beams typically overfill the hole defined in aperture stop 123, and the light is therefore shaped as it passes through the hole. Because all of the beams intersect or overlap at aperture stop 123, the same aperture shape is imparted to all of the light beams. The shape of the aperture hole is typically rectangular, and is usually wider in the Y or scan direction than in the X or cross-scan direction.

Referring again to FIG. 3, beam conditioning system 125A is optically aligned between aperture stop 123 and polygon facets 135, and serves to condition the light beams to generate the desired telecentricity and focal characteristics described below. In the present embodiment, beam conditioning system 125A includes, in sequential order, a first cylinder lens 125-1, a first fold mirror 127-1, a second cylinder lens 125-2, a second fold mirror 127-2, a third cylinder lens 125-3, a fourth cylinder lens 125-4, and a fifth cylinder lens 125-5. Cylinder lenses 125-1 to 125-5 and fold mirrors 127-1 and 127-2 are sequentially optically aligned between aperture stop 123 and deflector 130 in the manner depicted in FIG. 3.

FIG. 5 is an unfolded diagram depicting a first telecentric objective lens subsystem 125A-X (shown in block form), which makes up a portion of beam conditioning system 125A, and functions to focus and generate a desired cross-scan beam spacing in the vicinity of polygon facet 135. Referring briefly to FIG. 3, in one embodiment telecentric objective lens subsystem 125A-X is formed by first cylinder lens 125-1, third cylinder lens 125-3, and fifth cylinder lens 125-5, which are formed and arranged to have optical power only in the X (cross-scan) direction. In another embodiment, objective lens subsystem 125A-X could be formed by one or more lenses. Telecentric objective lens 125-1, 125-3 and 125-5 have surface curvatures that are orthogonal to the surface curvatures of pupil relay lenses 125-2 and 125-4, discussed below. As indicated in FIG. 5, lens subsystem 125A-X has a front focal length (FFL) and back focal length (BFL) (the FFL and BFL are those of the three lens system in combination), and is positioned between aperture stop 123 and deflector 130 such that the front focal point of subsystem 125A-X is located at or near aperture stop 123, and the back focal point of subsystem 125A-X is located in the vicinity of mirror facet 135. The collimated beams emerging from aperture 123 are focused in the cross-scan direction at the back focal point. Because these beams emerge from aperture 123 at or near the front focal point, the chief or center ray of each beam incident upon polygon facet 135 is traveling parallel or near-parallel to the Y-Z plane, and therefore forms a set of telecentric beams in the cross-scan direction at polygon facet 135. The exact cylindrical surface curvatures and lens positions of lenses 125-1, 125-3 and 125-5 are selected to achieve the aforementioned properties, and obtain the focal length that provides the desired cross-scan beam spacing at polygon facet 135.

FIG. 6 is an unfolded diagram depicting an optical system between the aperture 123 and the polygon facet 135. Lens subsystem 125A-Y is formed by second cylinder lens 125-2 and fourth cylinder lens 125-4, which are formed and arranged to have optical power only in the Y (scan) direction, and form an a focal optical system in the scan direction. Subsystem 125A-Y functions as a pupil relay system in the scan direction, and can also be designed to expand the diameter of the beams in the scan direction if needed. Lenses 125-2 and 125-4, which respectively have focal lengths $f_2$ and $f_4$, are positioned such that the front focal point of second cylinder lens 125-2 is located in the vicinity of aperture 123, and the back focal point of fourth cylinder lens 125-4 is located in the vicinity of polygon facet 135. In this configuration aperture 123 will be imaged in the vicinity of polygon facet 135. Therefore, the pupil or aperture will be relayed to a plane in the vicinity of facet 135. This arrangement minimizes the size of polygon facets 135, which must be large enough to capture all of the beams, because the collimated beams that emerge from aperture 123 will intersect in the scan direction at the back focus of fourth cylinder lens 125-4 in the vicinity of polygon facet 135, as shown in FIG. 6. Note also that, because second cylinder lens 125-2 and fourth cylinder lens 125-4 form an afocal system, the beams will be collimated in the scan direction as they travel into polygon facet 135. In addition, second cylinder lens 125-2 and fourth cylinder lens 125-4 may be alternatively positioned outside, inside or in between the lenses making up telecentric objective lens subsystem 125A-X. As such, the ordering of lenses 125-1 to 125-5 in the disclosed embodiment is intended to be illustrative by not limiting unless specifically recited in the appended claims.

By providing beam conditioning system 125A with both telecentric objective lens subsystems 125A-X and 125A-Y, described above, beams traveling along second beam path LP2 are focused in the X or cross-scan direction and collimated in the Y or scan direction, and the plural light beams are individually focused as linear images in the vicinity of polygon facet 135.

Referring again to FIG. 3, first fold mirror 127-1 and second fold mirror 127-2 are flat mirrors that direct and configure the optical path between laser array 110 and polygon facet 135 so that pre-polygon optical subsystem 120 will fit within a suitable mechanical envelope or package.

As indicated in FIG. 3, after passing through pre-polygon optical subsystem 120, the light beams are scanned along a first scan path SP1 into post-facet optical subsystem 140, which includes first and second cylinder scan lenses 142A1 and 142A2, which together form f-θ scan lens system 142A, a first cylinder mirror 145A1, a second cylinder mirror 145A2, a third fold mirror 147, a third cylinder mirror 145A3, an output window 149. Light beams passed through output window 149 are directed along second scan path SP2 onto photoreceptor 16.

Figure 7:
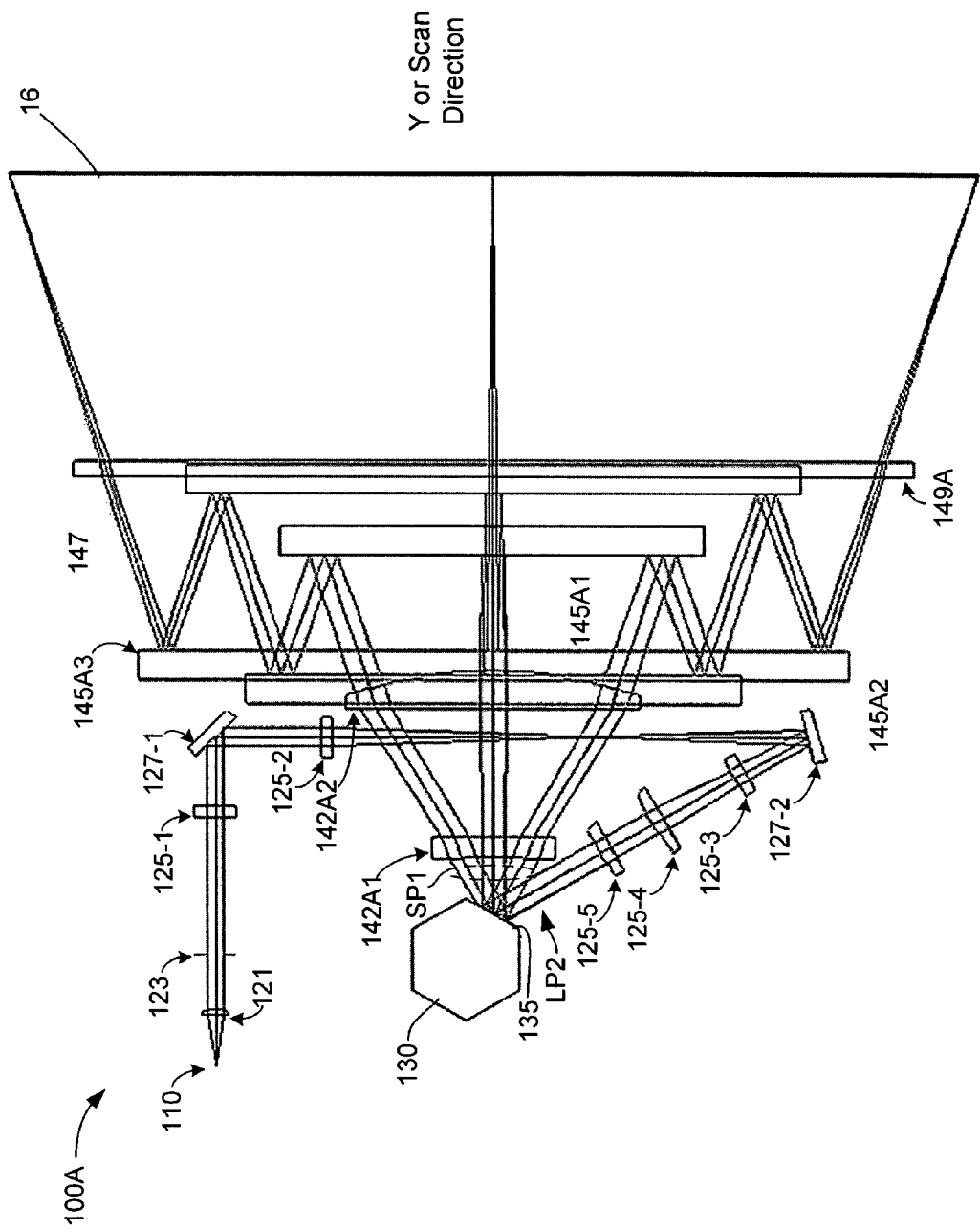
FIG. 7 is a top plan view showing the multiple beam scanning system of FIG. 3.
Figure 8:
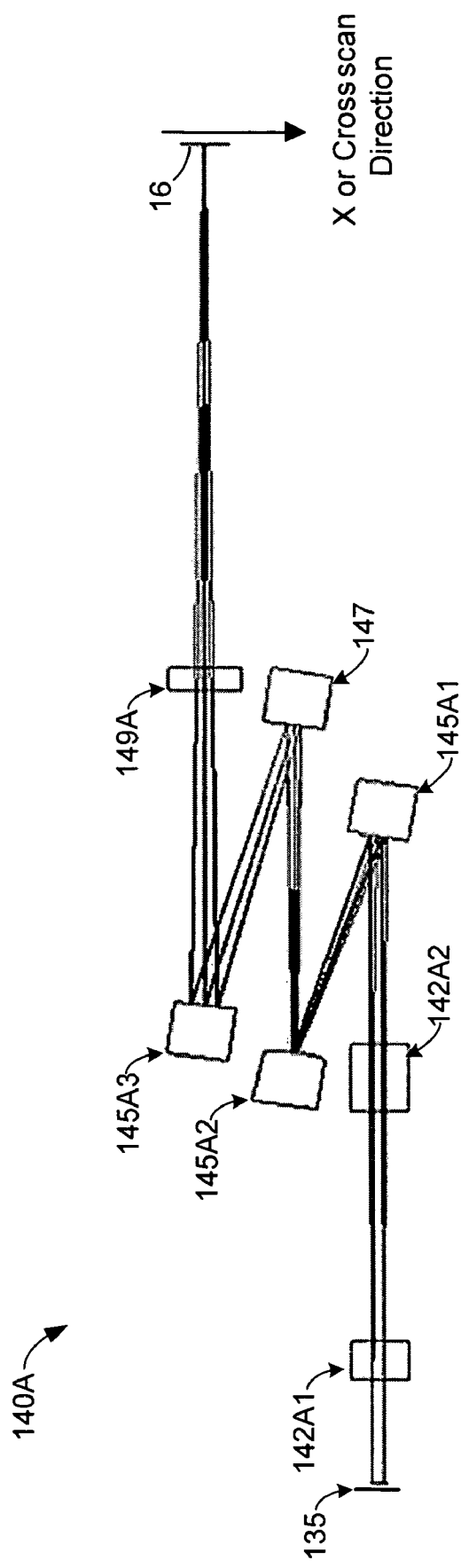
FIG. 8 is a side elevation view showing a post-polygon optical subsystem utilized in the pre-polygon optical subsystem of the multiple beam scanning system of FIG. 3.

FIG. 7 is a top plan view showing multiple beam optical scanning system 10A, and FIG. 8 is an elevation view showing post-polygon optical subsystem 130.

Referring to FIGS. 7, the plural light beams incident on the deflector 130 are deflected in first scan direction SP1 by the rotation of each mirror facet 135 through and across f-θ scan lenses 142A1 and 142A2, wobble correction cylinder mirrors 145A1, 145A2 and 145A3, fold mirror 147, and output window 149A, and are directed along second scan direction SP2 to produce a scan line along photoreceptor 16.

First scan lens 142A1 and second scan lens 142A2 have optical power only in the Y (scan) direction. Together they form an f-θ scan lens that linearizes the scan position on photoreceptor 16 as a function of scan angle, and simultaneously focuses each individual beam at the photoreceptor in the scan direction.

First cylinder mirror 145A1, second cylinder mirror 145A2, and third cylinder mirror 145A3 have optical power only in the X or cross-scan direction. Fold mirror 147 is a flat mirror that is used to help direct and configure the optical path between scan lens 142 and photoreceptor 16 so that post-facet optical subsystem 140 will fit within a suitable mechanical envelope or package. Output window 149A is used to isolate and protect the rest of the scanning optical system from the external environment.

According to an aspect of the present invention, first cylinder mirror 145A1, second cylinder mirror 145A2, and third cylinder mirror 145A3 together form an afocal system that has a conjugate relationship in the cross-scan direction between a plane in the vicinity of polygon facet 135 and photoreceptor 16. The conjugate relationship compensates for cross-scan facet tilt error which produces scan line wobble at photoreceptor 16, and also simultaneously focuses each individual beam at the photoreceptor in the cross-scan direction. The afocal property takes the plural light beams that are parallel to the Y-Z plane at polygon facet 135 and maintains this parallelism as the beams exit the optical system and impinge on photoreceptor 16. This characteristic is important because the spacing between beams will not change rapidly with Z-direction photoreceptor position errors.

According to another aspect of the present invention, first cylinder mirror 145A1 has a concave cross-scan cylindrical reflecting surface, second cylinder mirror 145A2 has a convex cross-scan cylindrical reflecting surface, and third cylinder mirror 145A3 has a concave cross-scan cylindrical reflecting surface. The exact cylindrical surface curvatures and mirror spacings are selected to (1) create an afocal system, (2) establish a conjugate relationship in the cross-scan direction between a plane in the vicinity of polygon facet 135 and the photoreceptor plane to correct scan line wobble and focus the light beams at photoreceptor 16 in the cross-scan direction, and (3) obtain the cross-scan magnification needed to achieve the desired cross-scan beam spacing at the photoreceptor.

FIGS. 9(A) and 9(B) are unfolded diagrams comparing the optical characteristics of the three cylinder mirror architecture of post-polygon optical system 140A (shown in FIG. 9(A)) with the conventional two cylinder mirror architecture disclosed in Ichikawa U.S. Pat. No. 6,833,939 (cited above, depicted in FIG. 9(B)). As indicated, the three-cylinder mirror architecture provides enough degrees of freedom to achieve the three optical properties mentioned above. In addition, the three cylinder mirror architecture provides a significantly larger physical distance D2 between the last mirror in the system (i.e., third cylinder mirror 145A3) and photoreceptor 16 than that provided by the conventional two mirror architecture of FIG. 9(B), and achieves near zero levels of scan line bow.

Figure 10:
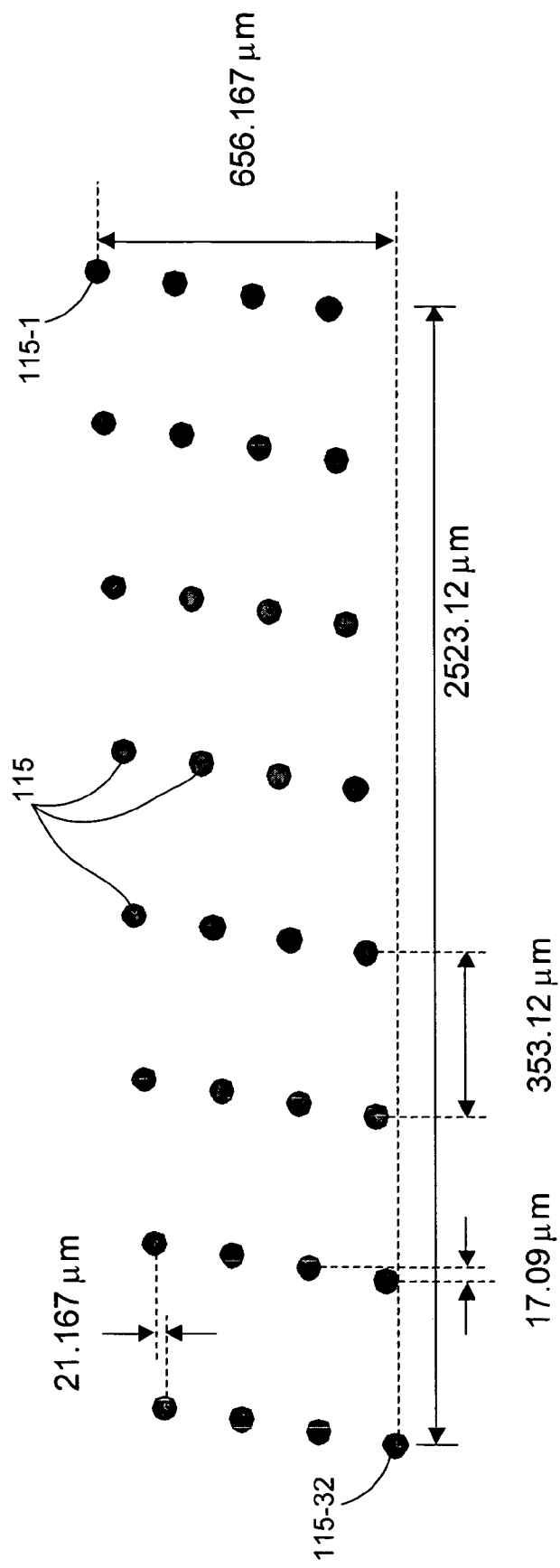
FIG. 10 is a simplified diagram showing a beam pattern generated on a photoreceptor in accordance with an aspect of the present invention.
Figure 11:
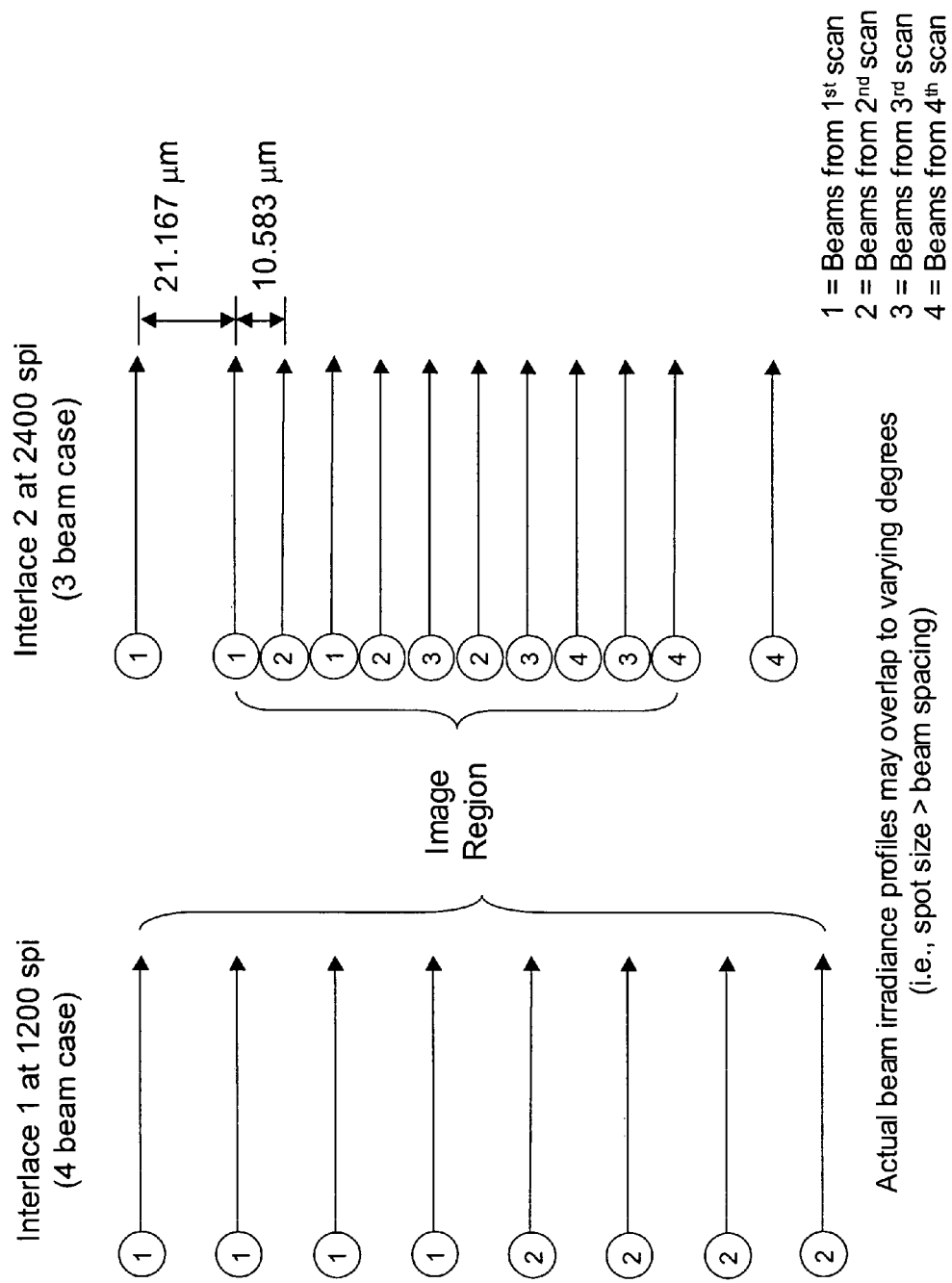
FIG. 11 is a simplified diagram showing a beam pattern generated on a photoreceptor in accordance with an aspect of the present invention.

In one embodiment, 32-beam laser array 110 is used in the rotated (80.84° clockwise rotation) array configuration shown in FIG. 4(B). In this configuration the light emission points are spaced at 4.459 µm intervals in the cross-scan direction. The focal length of the collimator lens is 23.3 mm, the cross-scan focal length of the cylinder lens 125-1, 125-3, and 125-5 combination is 650.68 mm. The cross-scan magnification from the laser array to the polygon facet is −27.926 and the cross-scan magnification from the polygon facet to the photoreceptor is −0.17. So the cross-scan magnification from the laser array to the photoreceptor plane is 4.747. Therefore, when the plural light beams emitted from the laser array at the cross-scan direction interval of 4.459 µm are imaged or focused on the photoreceptor or recording medium, the image can be written at intervals (i.e., spacing between incident light points 115) of 21.167 µm (4.459 µm×4.747), as shown in FIG. 10. This interval is equivalent to an image writing density of 1200 spi using an interlace 1 scanning scheme with 32 beams or an image writing density of 2400 spi using an interlace scanning scheme with 31 beams. The interlace scanning schemes are illustrated in FIG. 11 for lower numbers of beams.

In the above example, the Y (scan) direction magnification from the laser array to the photoreceptor or recording medium is 12.7743. The various beam intervals at the photoreceptor plane in the scan direction are shown in FIG. 10. The length of the scan on the photoreceptor is 15 inches, and the differential scan line bow achieved over this length is less than 0.212 µm. Differential bow is illustrated in FIG. 12, and described above. The working distance D2 (FIG. 9(A)) between cylinder mirror 145A3 and the photoreceptor exceeds 200 mm, which is almost twice as large as working distance D1 (FIG. 9(B)) typically achieved with the conventional two-cylinder mirror architecture. Comparable differential bow numbers and 200 mm spacing between cylinder mirror 145A3 and the photoreceptor were achieved for the non-rotated laser array configuration shown in FIG. 4(A). Also, comparable differential bow numbers and 200 mm spacing between cylinder mirror 145A3 and the photoreceptor were achieved for an interlace three scanning scheme with 32 beam configuration, where the cross-scan beam interval at the photoreceptor is 31.75 µm.

Although the three-mirror arrangement described above with reference to multiple beam scanning system 100A is presently considered superior to other embodiments, those skilled in the art will recognize that one or more of the mirrors of post-polygon optical subsystem 140A may be replaced with a lens, provided the modified optical element arrangement satisfies the positive-negative-positive (converging-diverging-converging) sequence of the present invention. An exemplary embodiment, including one lens and two mirrors is described below with reference to FIGS. 13 to 15.

Figure 13:
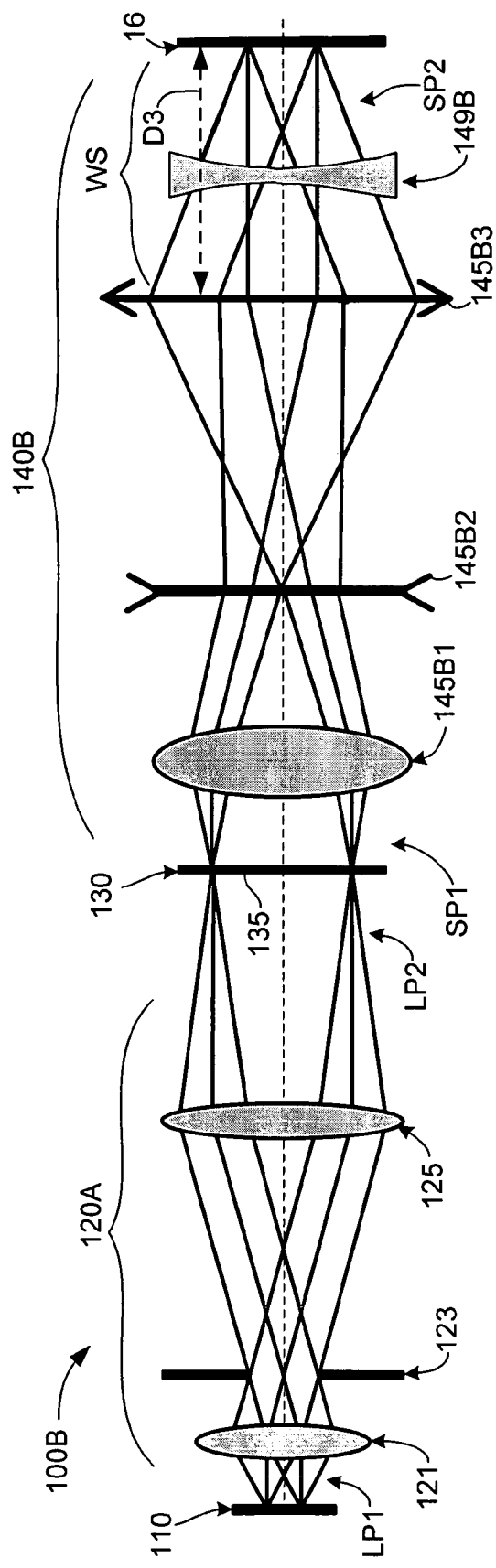
FIG. 13 is an unfolded, cross-scan diagram showing a multiple beam scanning system according to a second specific embodiment of the present invention.

FIG. 13 is an unfolded, cross-scan diagram showing a multiple beam scanning system 100B according to a second embodiment of the present invention. Similar to scanning system 100A (described above), scanning system 100B generally includes laser array 110, pre-polygon optical subsystem 120A, deflector 130, and a post-polygon optical subsystem 140B. Pre-polygon optical subsystem 120A and deflector 130 are conceptually similar to corresponding structures utilized in scanning system 100A (described above), and therefore are not discussed in additional detail here. Rotating mirror facet 135 scans the light beams along first scan path SP1, where the scanned light beams are processed by post-polygon optical subsystem 140A.

In accordance with the present embodiment, post-polygon optical subsystem 140B includes a first optical element comprising a cylinder lens 145B1 with a convex surface, a second optical element comprising a convex cylinder mirror 145B2, and a third optical element comprising a concave cylinder mirror 145B3 that are sequentially optically arranged between deflector 130 and an output window 149B. As indicated by the optical lines depicted in FIG. 13, the light received by convex cylinder lens 145B1 is converged and directed onto convex cylinder mirror 145B2, which diverges and redirects the light beams onto concave cylinder mirror 145B3, which in turn reconverges the light beams, and passes the reconverged light beams through output window 149B and onto photoreceptor 16. Thus, post-polygon optical subsystem 140B utilizes a positive-negative-positive optical element arrangement similar to that utilized in post-polygon optical subsystem 140A (described above), but convex lens 140B1 is utilized in place of a mirror. However, similar to post-polygon optical subsystem 140A, post-polygon optical subsystem 140B facilitates the formation of concave cylinder mirror 145B3 with a relatively long focal length, thereby providing a substantially longer working distance D3 than the working distance D1 that is possible in conventional two-mirror arrangements (depicted in FIG. 2(B)).

In accordance with an aspect of the second embodiment, an optional fourth cylindrical optical element may be utilized to balance unwanted optical characteristics that may be introduced by the use of convex cylinder lens 145B1. As indicted in FIG. 13, this fourth optical element may be introduced by forming output window 149B as a concave cylinder lens.

Figure 14:
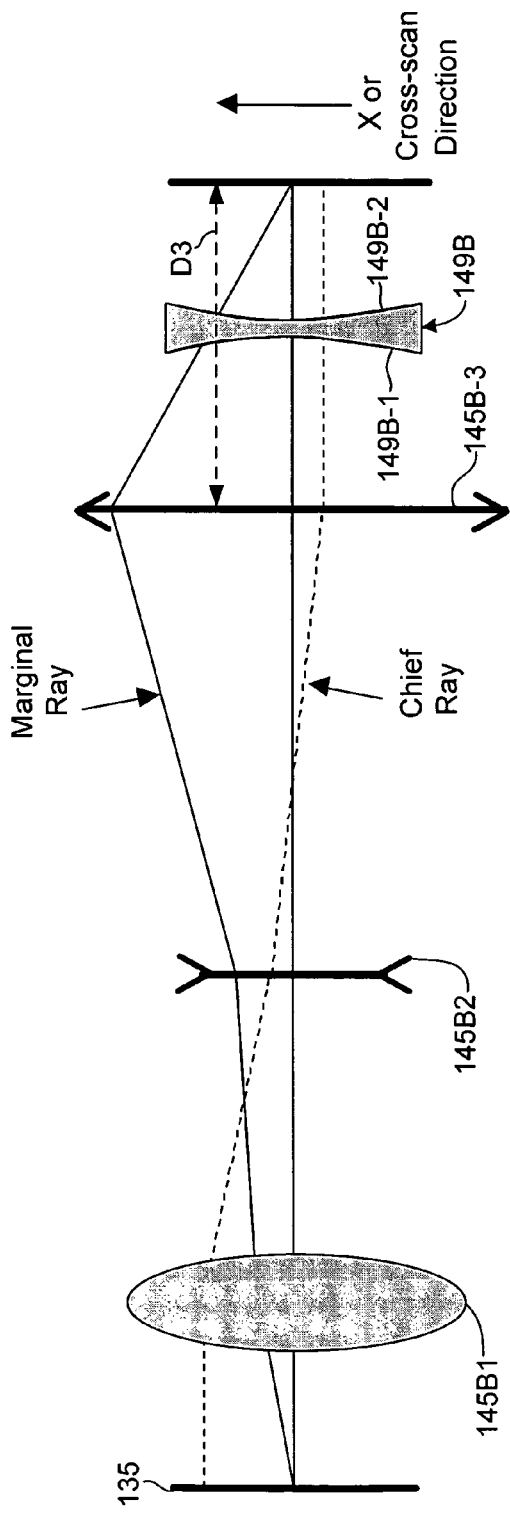
FIG. 14 is a simplified unfolded diagram showing optical characteristics of a post-polygon optical subsystem of the multiple beam scanning system of FIG. 13.
Figure 15:
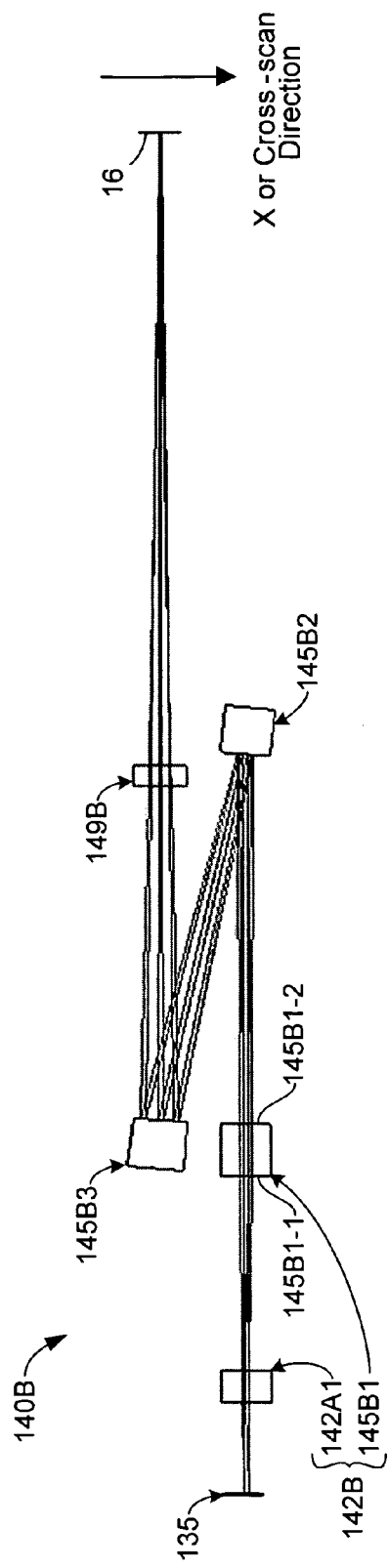
FIG. 15 is a side elevation view showing a post-polygon optical subsystem utilized in the pre-polygon optical subsystem of the multiple beam scanning system of FIG. 13.

FIGS. 14 and 15 are a simplified unfolded diagram and a side elevation view showing optical characteristics of post-polygon optical subsystem 140B in additional detail. Referring to FIG. 15, scan lens system 142B includes a first lens 142A1 that is similar to the corresponding scan lens of subsystem 140A (described above), and a second scan lens 145B1. First scan lens 145A1 has optical power only in Y (scan) direction, but second scan lens 145B1 has a first surface 149B1-1 having optical power only in the X (cross-scan) direction, and a second surface 149B1-2 having optical power only in the Y (scan) direction. Together scan lenses 142A1 and 142B1 form an f-θ scan lens that linearizes the scan position on photoreceptor 16 as a function of scan angle, and simultaneously focuses each individual beam at photoreceptor 16 in the scan direction. Second scan lens 142B1 also provides some of the refractive optical power in the X (cross-scan) direction for wobble (Facet Tilt Error) correction. Cylinder mirror 145B2 and cylinder mirror 145B3 have optical power only in the X (cross-scan) direction. Output window 149B, which is used to isolate and protect the rest of the scanning optical system from the external environment, has a first surface 149B-1 having optical power only in the X (cross-scan) direction.

With the arrangement shown in FIGS. 13-15 and described above, the cross-scan magnification from the laser array to the polygon facet is −6.539 and the cross-scan magnification from the polygon facet to the photoreceptor is −0.726. So the cross-scan magnification from the laser array to the photoreceptor plane is 4.747. In addition, the length of the scan on the photoreceptor is 15 inches and the differential scan line bow achieved over this length is larger, and therefore poorer, than that of the preferred embodiment. The separation between cylinder mirror 145B3 and the photoreceptor exceeds 200 mm, which is almost twice as large as what can typically be achieved with the conventional two-cylinder mirror architecture.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A multiple beam scanning system for scanning a plurality of light beams onto a predetermined surface in a predetermined scan direction, the scanning system comprising:
   a light source for generating the plurality of light beams along a first light path;
   a first input and output telecentric optical subsystem including at least one optical element aligned to redirect the plurality of light beams along a second light path;
   a deflector including a reflection surface that periodically intersects an end of the second light path, and means for moving the reflective surface such that the plurality of light beams are periodically scanned along a first scan path; and
   a second input and output telecentric optical subsystem including a plurality of optical elements that are sequentially optically aligned to receive the light beams scanned along the first scan path, and to redirect the scanned plurality of light beams along a second scan path onto the predetermined surface,
   wherein the plurality of optical elements of said second input and output telecentric optical subsystem comprise a positive cross-scan cylindrical first optical element, a negative cross-scan cylindrical second optical element, and a positive cross-scan cylindrical third optical element.

2. The multiple beam scanning system according to claim 1, wherein the first optical element comprises a first concave cylinder mirror, the second optical element comprises a convex cylinder mirror, and the third optical element comprises a second concave cylinder mirror.

3. The multiple beam scanning system according to claim 2, wherein the second input and output telecentric optical subsystem further comprises at least one scan lens positioned in the first scan path between the deflector and the first convex cylinder mirror.

4. The multiple beam scanning system according to claim 2, wherein the second input and output telecentric optical subsystem further comprises a flat output window positioned in the second scan path such that the output window is positioned between the second concave cylinder mirror and the predetermined surface.

5. The multiple beam scanning system according to claim 2, wherein the second input and output telecentric optical subsystem further comprises a flat mirror positioned between the convex cylinder mirror and the second concave cylinder mirror.

6. The multiple beam scanning system according to claim 1, wherein the first optical element comprises a scan lens with positive refractive power, the second optical element comprises a convex cylinder mirror, and the third optical element comprises a concave cylinder mirror.

7. The multiple beam scanning system according to claim 6, wherein the convex cylinder lens of the scan lens comprises a first cylindrical surface that is convex in the cross-scan direction, and an opposing second cylindrical surface that is convex in the scan direction.

8. The multiple beam scanning system according to claim 7, wherein the second input and output telecentric optical subsystem further comprises a scan lens arrangement including a scan lens positioned in the first scan path between the deflector and the convex cylinder lens.

9. The multiple beam scanning system according to claim 6, wherein the second input and output telecentric optical subsystem further comprises a negative output window with a concave surface positioned in the second scan path such that the output window is positioned between the concave cylinder mirror and the predetermined surface.

10. The multiple beam scanning system according to claim 1, wherein the light source comprises a VCSEL device including a plurality of VCSEL structures disposed to generate the plurality of light beams.

11. The multiple beam scanning system according to claim 1, wherein the first optical subsystem comprises:
a collimator lens positioned in the first light path;
an aperture stop optically aligned with the collimator lens, and
a beam conditioning system comprising a plurality of cylinder lenses optically aligned between the light source and the deflector for directing the plurality of light beams along the second light path such that the plurality of light beams are focused in a cross-scan direction and re-collimated in the scan direction, and the plural light beams are individually focused as linear images adjacent to the deflector and have desired beam spacings in the scan and cross-scan directions at the deflector.

12. The multiple beam scanning system according to claim 11, wherein the beam conditioning system comprises a first telecentric objective lens subsystem including a first cylinder lens, a third cylinder lens and a fifth cylinder lens that are formed and arranged such that the first, third and fifth cylinder lenses have optical power only in the cross-scan direction.

13. The multiple beam scanning system according to claim 12,
wherein the first telecentric objective lens subsystem includes a front focal length and a rear focal length, and
wherein the first telecentric objective lens subsystem is positioned between the aperture stop and the deflector such that the aperture stop is positioned at the front focal length of the telecentric objective lens subsystem, and the deflector is positioned at the back focal length of the telecentric objective lens subsystem.

14. The multiple beam scanning system according to claim 11, wherein the beam conditioning system comprises a second telecentric objective lens subsystem including a second cylinder lens and a fourth lens that are formed and arranged such that the second and fourth cylinder lenses have optical power only in the scan direction.

15. The multiple beam scanning system according to claim 14,
wherein the second telecentric objective lens subsystem includes a front focal length and a back focal length, and
wherein a pupil relay lens subsystem is positioned between the aperture stop and the deflector such that the aperture stop is positioned at the front focal point of the second cylinder lens, and the deflector is positioned at the back focal point of the fourth cylinder lens.

16. The multiple beam scanning system according to claim 14, wherein the deflector comprises a polygonal mirror structure including multiple facet mirrors, and means for rotating the polygonal mirror structure such that the multiple facet mirrors sequentially intersect the second light path such that the plurality of light beams are repeatedly swept along the first scan path.

17. The multiple beam scanning system according to claim 14, further comprising a scan lens or scan optics comprised of at least one scan lens positioned between the deflector and the first optical element.

18. An image forming apparatus comprising:
a photoreceptor; and
a multiple beam scanning system for scanning a plurality of light beams onto a surface of the photoreceptor such that the plurality of light beams are scanned in a scan direction along the surface, the multiple beam scanning system comprising:
a light source for generating the plurality of light beams along a first light path;
a first input and output telecentric optical subsystem including at least one optical element aligned to redirect the plurality of light beams along a second light path;
a deflector including a reflection surface that periodically intersects an end of the second light path, and means for moving the reflective surface such that the plurality of light beams are periodically scanned along a first scan path; and
a second input and output telecentric optical subsystem including a plurality of optical elements that are sequentially optically aligned to receive the light beams scanned along the first scan path, and to redirect the scanned plurality of light beams along a second scan path onto the predetermined surface,
wherein the plurality of optical elements of said second input and output telecentric optical subsystem comprise a positive cross-scan cylindrical first optical element, a negative cross-scan cylindrical second optical element, and a positive cross-scan cylindrical third optical element.

19. The image forming apparatus according to claim 18, wherein the first optical element comprises a first concave cylinder mirror, the second optical element comprises a convex cylinder mirror, and the third optical element comprises a second concave cylinder mirror.

20. The image forming apparatus according to claim 18, wherein the first optical element comprises a convex cylinder lens, the second optical element comprises a convex cylinder mirror, and the third optical element comprises a convex cylinder mirror.

* * * * *